(12) United States Patent
Smith et al.

(10) Patent No.: US 10,223,449 B2
(45) Date of Patent: Mar. 5, 2019

(54) CONTEXTUAL SEARCH FOR GAMING VIDEO

(71) Applicant: Microsoft Technology Licensing, LLC, Redmond, WA (US)

(72) Inventors: Gregory M Smith, Seattle, WA (US); Joaquin Bolbrugge Chavolla, Redmond, WA (US); Craig J. Wheeler, Woodinville, WA (US); Joanna Mason, Redmond, WA (US); Nathan A. Yim, London (CA); Kewei Li, Cambridge, MA (US); Abdalla Gamal A. Abdulmonem, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 75 days.

(21) Appl. No.: 15/199,643

(22) Filed: Jun. 30, 2016

(65) Prior Publication Data
US 2017/0270128 A1 Sep. 21, 2017

Related U.S. Application Data

(60) Provisional application No. 62/308,816, filed on Mar. 15, 2016.

(51) Int. Cl.
*A63F 13/60* (2014.01)
*G06F 17/30* (2006.01)
(Continued)

(52) U.S. Cl.
CPC .......... *G06F 17/3082* (2013.01); *A63F 13/20* (2014.09); *A63F 13/25* (2014.09);
(Continued)

(58) Field of Classification Search
CPC ...................................................... A63F 13/60
See application file for complete search history.

(56) References Cited

U.S. PATENT DOCUMENTS 4,752,069 A 6/1988 Okada
8,622,839 B1 1/2014 Mckenzie et al.
(Continued)

FOREIGN PATENT DOCUMENTS

WO WO2015134724 A1 9/2015

OTHER PUBLICATIONS

"International Search Report and Written Opinion Issued in PCT Application No. PCT/US2017/021236", dated Apr. 19, 2017, 13 Pages.

*Primary Examiner* — Omkar Deodhar
(74) *Attorney, Agent, or Firm* — Arent Fox LLP

(57) ABSTRACT

Techniques and architectures of a system may provide, among other things, a contextual help video based, at least in part, on the state of play of a user of a video game or the state of other types of interactive media content. For example, such video may be useful for self-learning using contextual video that provides useful information to the player (or a user of interactive media content). The system may involve a contextual search process, which may enable games to annotate broadcasts and game clips with real time metadata from their titles. Websites may query a service for broadcasts/game clips based on data generated by a contextual search. The system may add context to recorded and live game media and, for example, capturing and exposing a user's gaming moments.

18 Claims, 8 Drawing Sheets

(51) Int. Cl.
  *A63F 13/25* (2014.01)
  *A63F 13/335* (2014.01)
  *A63F 13/49* (2014.01)
  *A63F 13/86* (2014.01)
  *A63F 13/20* (2014.01)
  *A63F 13/80* (2014.01)

(52) U.S. Cl.
  CPC ............ *A63F 13/335* (2014.09); *A63F 13/49* (2014.09); *A63F 13/80* (2014.09); *A63F 13/86* (2014.09); *G06F 17/30817* (2013.01); *G06F 17/30858* (2013.01); *G06F 17/30867* (2013.01)

(56) References Cited

U.S. PATENT DOCUMENTS

| | | |
|---|---|---|
| 8,856,650 B1 | 10/2014 | Off |
| 2003/0016238 A1 | 1/2003 | Sullivan et al. |
| 2005/0246638 A1 | 11/2005 | Whitten |
| 2007/0087797 A1* | 4/2007 | Van Luchene .......... A63F 13/12 463/1 |
| 2007/0191097 A1 | 8/2007 | Johnson |
| 2008/0220869 A1 | 9/2008 | Midgley et al. |
| 2009/0088233 A1 | 4/2009 | O'Rourke et al. |
| 2009/0131177 A1 | 5/2009 | Pearce |
| 2010/0041475 A1 | 2/2010 | Zalewski et al. |
| 2011/0281648 A1 | 11/2011 | Weising |
| 2013/0005471 A1 | 1/2013 | Chung et al. |
| 2013/0116022 A1 | 5/2013 | Davison et al. |
| 2015/0242504 A1* | 8/2015 | Profitt ................. G06F 3/04842 707/767 |
| 2015/0290540 A1 | 10/2015 | Trombetta et al. |
| 2015/0379407 A1* | 12/2015 | Woon ..................... A63F 13/35 3/35 |

\* cited by examiner

CONTEXTUAL SEARCH FOR GAMING VIDEO

CROSS REFERENCE TO RELATED APPLICATIONS

This claims priority to U.S. Provisional Patent Application No. 62/308,816, filed on Mar. 15, 2016, which is incorporated herein by reference.

BACKGROUND

Among interactive media enthusiasts, such as computer game enthusiasts, broadcasting live video and uploading video clips of computer interactive media sessions (e.g., game sessions) is widely popular. In one known hosting system, users post links to live video streams and/or video clips of in-session video (e.g., in-game video) to a hosting site, for viewing by other users. In the known hosting system, this video data may be organized by channels, each channel being established by a user, and typically organized around a theme such as a particular game title. Within each channel, the user that curates the channel may post links to live video and video clips of in-session video, which may be viewed by viewers who view the videos in the channel.

Video content may be created and uploaded by users from various disparate gaming platforms to a hosting system, and users' craft titles of their video feeds, clips, and channels. The hosting system may include a search tool that enables users to enter keyword search queries to be matched against textual titles of live video feeds, video clips, and channels. While this provides users some ability to locate content, the textual titles of the videos themselves are subject to the whims of individual users and thus the content returned in a search query may not be relevant to the viewer, or is too voluminous to be helpful. Thus, viewers may be forced to sort through a large number of files when searching for relevant interactive media video and in many cases may not find content which is relevant to them despite the search.

SUMMARY

A system provides, among other things, a contextual video clip based, at least in part, on the state of play of a user (or multiple users) of a video game or the state of other types of interactive media content. For example, such video may be useful for self-learning using contextual video that provides useful information to the player (or a user of interactive media content). The system may involve a contextual search process, which may enable games to annotate broadcasts and video game clips with real time metadata from their titles (e.g., video game titles). Websites may be able to query a service for broadcasts/video game clips based on data generated by a contextual search. Various applications and games may also query a service for broadcasts/video game clips based on data generated by a contextual search. The system may add context to recorded and live game media and, for example, may capture and expose a user's extraordinary (and ordinary) gaming moments.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
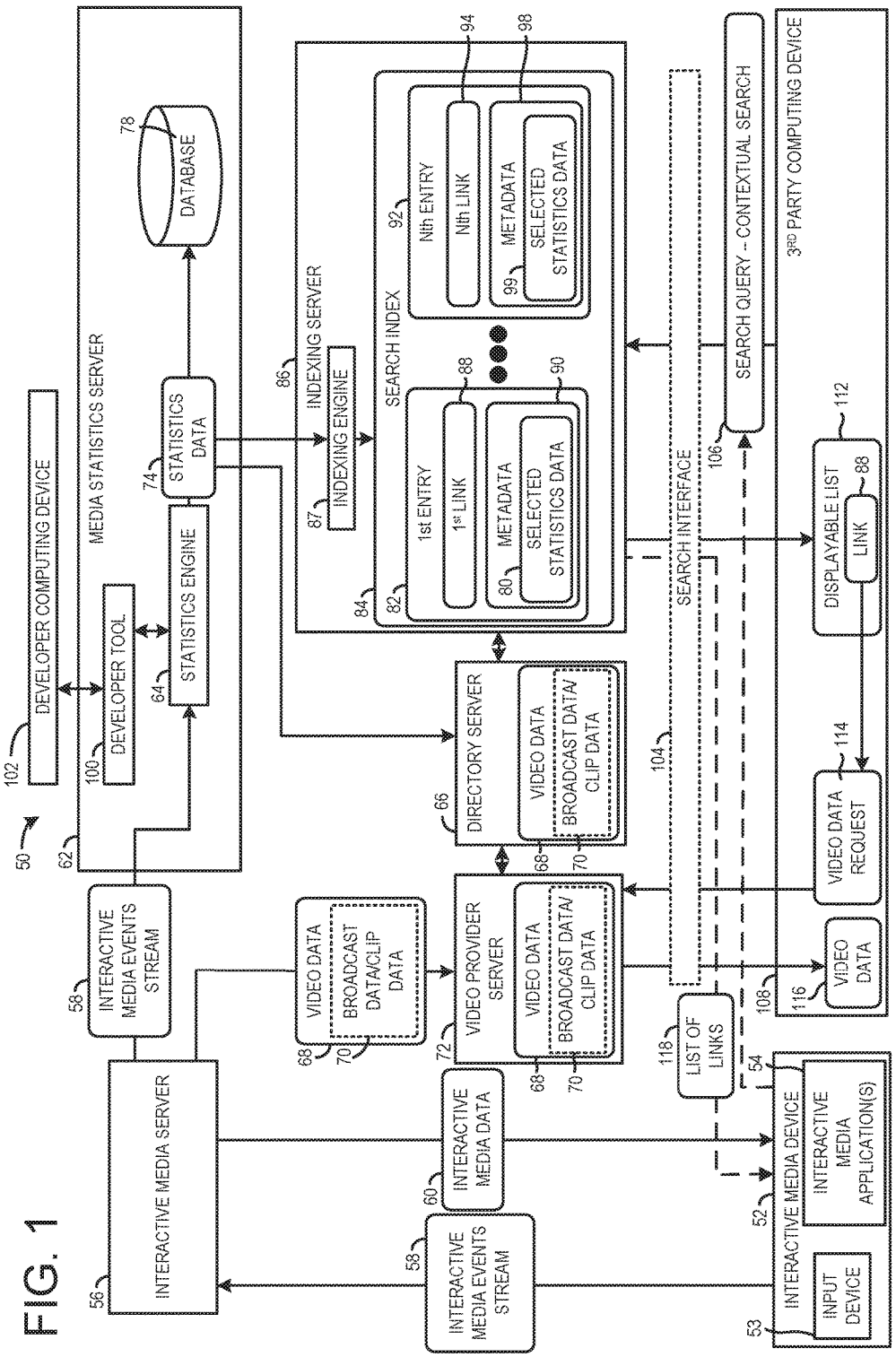
FIG. 1 is a schematic depiction of an example system for annotating interactive media content and media clips for contextual search.

Various examples describe techniques and architectures for a system that provides, among other things, video targeted for a user of video games. For example, such video may be useful for self-learning using contextual video that provides useful information to a gamer (or a user of interactive media content). The system may implement techniques that improve the curating, developing, and surfacing of appropriate video content based on the usage of interactive media content as well as incorporating user feedback, for example.

The system may involve a contextual search process, which can enable games to annotate broadcasts and video game clips with real time metadata from their titles (e.g., video game titles). For a particular example, a contextual search process may be provided by Xbox Live®, of Microsoft Corporation, Redmond, Wash. In some implementations, websites may be able to query a service for broadcasts/game clips based on data generated by a contextual search. The system may add context to recorded and live game media and, for example, capturing and exposing a user's (e.g., gamer's) gaming moments (e.g., such as those involving outstanding performance, interesting situation, etc.). Herein, "video clips" and "video" are used interchangeably. Generally, a video, as described herein, is a relatively short (e.g., a few seconds to several minutes) video of game play, though claimed subject matter is not so limited. Game media may include any of video game clips, screenshots, and broadcasts thereof, just to name a few examples. Context comprises, among other things, criteria associated with the game media. The criteria may involve a challenge, goal, or other milestone of the user during game play (e.g., passing a level, finishing a maze, earning a reward, earning points, etc.).

In some examples, such as those involving the Xbox Live® data platform, contextual search may be initialized using a game title to create a configuration document. Game media created based, at least in part, on a game title may appear in various experiences, such as Twitch®, Xbox One®, the Xbox App on PC®, YouTube®, and any of a number of other providers with metadata annotating automatically enabled, for example. Such game titles may be configured to generate metadata based on parameters that tend to be important to a player for the particular game title and thus may be relatively useful for a contextual search.

In some examples, a companion application (e.g., shared resource application (SRA—on XB1 before Windows10, for example) or universal windows application (UWA—Win10 App. platform, for example)) may be created that leverages the contextual search service's APIs to search and surface gaming media.

In some examples, a contextual search experience may be built directly into an exclusive resource application (ERA—such as games on Xbox one), leveraging the search APIs to surface content from game. A video may be rendered directly in an ERA, such as in GameClips® (e.g., a game video clip from Xbox Live).

In some examples, a contextual search service may allow game titles an ability to store data using statistics that update in real time. For example, a game may configure ten or so types of statistics as contextual search statistics.

Such statistics may be selected to configure a contextual search, which may filter and sort media based, at least in part, on the statistics. Statistics may represent the state of one or more users (e.g., gamers) in the game. Some examples are the Game Mode, Level/Map/Missions, Character/Role, Act, Boss Fight. These statistics are useful to filter down selections for media. Statistics may represent the skills/progress of the player. Some examples include K/D Ratio, Rank, Prestige, Single Player Mission %, Best Traversal. These statistics may be useful for sorting. Additionally, they may be used for Hero Stats. In another example, statistics may include SinglePlayerMap and MultiplayerMap, which may be used to filter content.

In some cases, such statistics may be a priori part of a game title's configuration. A contextual search process may use such statistics by including additional metadata, for example. Statistics may be available to query.

Subsequent to selecting statistics, metadata may be added so the contextual search process may correctly search based on the statistics, and a dynamic UI may be surfaced for end users to search. There may be different configuration experiences available between Xbox Developer Portal and Universal Developer Center, but the underlying data may be similar or the same.

Individual contextual search statistics may contain the following metadata: Display String—a localizable string exposed to the end user. Filter—Boolean on whether the statistic is filterable. Sort—Boolean on whether the statistic is sortable. Representation Type—three options: Set—This is associated with a set of potential statistic values mapped to localizable strings. Numbers and Strings may be allowed here; Defined Range—this includes a min and max value. One may both filter and sort off of these values. Numbers only; Undefined Range—No limits, so only sorting may be allowed. Priority (surfaced in upcoming V2 APIs)—this is used for prioritizing statistics in a UI or search experience by what is most important first.

In some examples, updating a contextual search may be performed by changing the statistics in a contextual search document. If a new statistic is added, game clips and broadcasts created after the change may go into effect and may be annotated and surfaced in queries using the new statistic. Old game clips may not be query-able from this statistic. If a statistic is removed from the contextual search document, the old statistic attached to a game clip may not be useful and may not be returned in some examples.

In some examples, a contextual search process may enable game titles to update their configuration out of a band of title updates. While the Schema of the game title configuration handler may remain the same, the data contained within may be subject to change.

In some examples, contextual search APIs may be integrated into an SRA and may render Twitch® broadcasts in the application itself.

In some scenarios involving interactive media content, contextual search may allow for serving up video of a map a user is about to play in matchmaking, show video of users leveraging new downloadable content (DLC) on a store page, celebrate top players by showing a broadcast playlist of the players with the top competitive skill ranking, and show contextual help video (or help screenshots) based on where a user is in a game, just to name a few examples.

For example, a user, while playing a video game, may be able to view of video clip of the video game that is particularly relevant to the user's situation in the game. The user, perhaps being stuck on a level of the game or questioning what how to play next, may opt to see a video clip that will help the user proceed to play the game. The video clip may be subsequently rendered based, at least in part, on at least some of the statistics associated with the user and/or the game at the time the user opted to view the video clip. In some implementations, the video clip may be rendered from a search of a relatively large number of video clips stored in a network (e.g., the Cloud), where the search may be based on the statistics of the user and/or the game at a particular time (e.g., the time that the user opted to view a video clip).

In some examples, data that is annotated may include data associated with multiplayer session information (e.g., number of players, stats for each of the players, etc.) or competitive gaming tournament data. Such data may be derived from a structured (multiplayer) competitive tournament (coming from any of a number of services (e.g., Xbox® or other)), and such data may originate from the game client itself (e.g., of a player).

In an example of implementation of contextual search for use in retrieving a help video or help screenshot, a number of players may be interactively playing a video game (or engaging in another type of interactive media content). At any given time there are a number of parameters that define, at least in part, the state of the video game, in addition to the state of each player. For example, one player may have a particular position in the game, be equipped with particular tools, and so on, while another player will have another position in the game, be equipped with (possibly) different tools, and so on. The particular state of the game at a specific time, and the status or state of one or more of the players, may be used to retrieve a stored video clip of a portion of the video game that relatively closely matches that of the status of the game and/or players. Such a retrieved video may be used by any one of the players, for example, as a help video, to assist the player(s) in getting past a difficult part of the game, or to assist in determining a next move that the player(s) may make, etc. On a client device, for example, which the player may be using to play the game, the user may mouse over or otherwise select a help option, which may initiate a contextual search for a "related" video.

Implementations described herein may involve video clips, screenshots, metadata, or other such information that are stored on a network, such as in the Cloud. But such information (or portions thereof) may be stored in any of a number of locations, such as on personal computing systems, etc.

In one exemplary method, media statistics data, which may be in the form of metadata, may be generated during an interactive media session in tandem with a live broadcast video stream via a media statistics server. The statistics data may be generated in near real-time, to decrease delays in downstream search queries, if desired. The statistics data may be subsequently indexed for search queries via an indexing server and linked to a contextual search process or live broadcast video stream provided by a directory server and/or video provider server. A search interface may then be provided to search the statistics data that is linked to archived or live video streams of the interactive media sessions. In this way, relevant statistical data may be generated during broadcast of an interactive media session and used for subsequent search, enabling a user or contextual search process to quickly search through a large database providing archived (e.g., recorded and stored) video or streaming interactive media sessions and find content which is relevant to them in the database.

Various examples are described further with reference to FIGS. 1-9.

FIG. 1 shows a schematic depiction of a system 50 for providing searchable video data generated from a plurality of interactive media sessions at an interactive media server. Such searches may be based, at least in part, on a contextual search process. For example, a search for particular video clips may be based, at least in part, on the context or state of a player (or players) with respect to a video game. Context comprises, among other things, criteria associated with the video game. The criteria may involve a challenge, goal, or other milestone of the user during game play (e.g., passing a level, finishing a maze, earning a reward, earning points, etc.). The interactive media server may be a game server, in this example. An interactive media session herein is defined as an interactive session generated by gaming media device in response to user input with an interactive media application. Thus, the interactive media session may include a plurality of user inputs that adjust or alter different aspects of an interactive media application. Thus, the interactive media session may include a plurality of user inputs, interactive media events, etc. It will be appreciated that in one example, the interactive media session may be a gaming session generated based on a user's interaction with a gaming application executed via a gaming device.

The system includes an interactive media server 56 that generates video data 68 for each of the interactive media sessions and a video provider server 72 that provides a connection to the video data 68 for viewing. The video data 68 may include archived (e.g., stored in memory) video or a live broadcast video stream corresponding to an interactive media session as well as video clips associated with the interactive media session. In this way, streaming broadcast video corresponding to a user's interactive media session can be generated by the interactive media server 56. The live broadcast video streams, which may be stored and archived, capture live interactive media sessions of interactive media applications. For instance, an interactive media session may include adjustment of a gaming environment generated through execution of an interactive media application in response to user input received via the interactive media device 52. The video data may also include long form recorded video content and/or video clips, in one example. Thus, the video data may include recording of previous live broadcasts. Still further in another example, the video data 68 on the video provider server 72 may include a data link to the video streams broadcast via the interactive media server 56 and/or interactive media device 52.

The system 50 includes the interactive media device 52, such as a game console, tablet, smartphone, etc., configured to run one or more interactive media applications 54. It will be appreciated that the device running the interactive media application(s) enable a user to interact with a user interface to generate visual feedback. Like all computing devices described herein, the interactive media device typically includes at least one processor and associated non-volatile memory for storing software programs, the processor being configured to execute the stored software programs using portions of associated volatile memory to achieve the various functions described herein. The non-volatile memory may be a CD-ROM, ASIC, FLASH, hard drive, or other storage device that when power is turn off, retains the data stored therein. The volatile memory may, for example, be a form of RAM.

The interactive media device 52 may further include an input device 53. The input device 53 may include one or more of a controller having button(s) and/or joystick(s), a keyboard, a mouse, a trackpad, a touch screen, a touch pad, a microphone, a video camera, etc. Thus in one example, the interactive media device may receive audio input from a microphone. In such an example, a user may provide commentary regarding an interactive media session. However, other types of audio input have been contemplated. For instance, the audio input may trigger adjustments in an interactive media application. In another example, the interactive media device may receive video input from a video camera. The video input may be associated with the aforementioned audio commentary, in one example, and therefore can be synchronized with the audio commentary. In this way, a user can record audio and video commentary related to an interactive media session. The audio and/or video commentary may be included in the video data 68, described in greater detail herein. However, in other example the video input may trigger adjustments in an interactive media application.

The interactive media device 52 may also include one or more interactive media applications 54. Thus, the interactive media device 52 is configured to execute one or more interactive media applications. It will be appreciated that the interactive media applications may be gaming applications such as role playing games, first person perspective games, open world games, 2-dimensional games, mobile games, etc. However, numerous types of interactive media applications have been contemplated.

The interactive media device 52 is in electronic communication with an interactive media server 56 via a computer network. Although a single interactive media device 52 is shown it will be appreciated that a plurality of interactive media devices may be in electronic communication with the interactive media server. Additionally, the interactive media device 52 may execute a multitude of interactive media applications. In the example described herein, interactive media device 52 is used to interact with interactive media server 52 and generate the video data 68, and the video data is viewed via third party computing device 108. However, it will also be appreciated that in other scenarios the interactive media device 52 itself may also view the video data 68.

During an interactive media session, the interactive media server 56 receives an interactive media events stream 58 sent from the interactive media device 52. The interactive media events stream 58 may include actions and events executed in the interactive media application, and may include user input from one or more user input devices of the interactive media device 52, such as a touchscreen, keyboard, mouse, controller, etc. An events stream may include a screenshot of video game play, for example. Following processing by the gaming server, the interactive media device 52 receives interactive media 60 from the interactive media server 56. Based upon the received interactive media data 60, the interactive media application 54 displays a state of the interactive media application on a display associated with the interactive media device. The state of the interactive media application continuously changes under the influence of media program logic and user inputs. In this way, the interactive media device implements an interactive media session of a server-based interactive media application that is hosted by interactive media server 56, which may be a one-player, two-player, or multi-player game.

To enable third parties and/or first party gainers themselves to view video of each interactive media session hosted by interactive media server 56, the interactive media server 56 is also configured to generate and send (recorded or real-time) video data 68 to a video provider server 72, which provides a connection to the video data for downloading/streaming by clients. In one example, the video provider server 72 may host the video data 68. Thus, the video provider server 72 can include the video data 68 including archived data, broadcast data, and/or clip data 70. However, in other examples the video provider server 72 may provide a data link between the broadcasting interactive media device 52, the interactive media server 56 broadcasting the video data, and/or a $3^{rd}$ party computing device. In such an example, the video data 68 sent to the video provider server 72 and directory server 66 may include a data link which may be stored in an internal cache in the video provider server 72. Therefore, the video data stored on the video provider server 72 may be a data link and the interactive media server 56 and/or interactive media device 52 that may host video data including broadcast data and/or clip data. In other envisioned architectures, the video data 68 may be hosted by the interactive media server 56 or the interactive media device 52.

The video data 68 may include broadcast data (e.g., live broadcast video stream) and/or clip data (i.e., downloadable video data) 70. Additionally or alternatively, the video data 68 may include a data link configured to connect a $3^{rd}$ party computing device to the device broadcasting the live video stream, such as the interactive media server 56 and/or the interactive media device 52. Each item of video data 68 corresponds to a specific interactive media session provided by the interactive media server 56. The broadcast data may be a live video stream that is broadcast of the interactive media session, and the clip data may be a stored video file of predetermined length that the video provider server 72 is configured to provide connection to for download. Specifically in one example, the video data may include only a live broadcast video stream.

The interactive media server 56 is configured to send the interactive media events stream 58 to a media statistics server 62. In particular, the interactive media events stream interactive media events stream 58 may be sent to a statistics engine 64 in the media statistics server 56. The statistics engine 64 is configured to generate statistics data 74 based on the interactive media events stream 58 and send the statistics data 74 to an indexing server 86, directory server 66, and a database 78. In one example, the statistics engine 64 may send only a portion of the statistics data to the indexing server 86. The statistics data 74 may include virtually any suitable data related to the interactive media session that is provided by the interactive media server. As some examples, the statistics data may include one or more of map type, weapon type, tool type, points data, character data, and level data. The indexing server 86 and specifically the indexing engine 87 is configured to index the contents of the directory within the director server 66, and store the results in a search index 84, that is updated periodically. Rapid updates, such as every 30 seconds, keep the search index fresh and current, reflecting the current state of the directory server 66. The search index typically includes an entry for each directory entry in the directory server. Thus, for each link stored in the directory server to video data provided by the video provider server 72, a corresponding entry such as entry 82 and entry 92 is created. In the depicted example, the $1^{st}$ link 88 and Nth link 94 are illustrated as stored within the $1^{st}$ entry 82 and Nth entry 92 in the search index. Along with each link 82, 92, the search index entries also contain a corresponding metadata 90, 98 that has been generated based upon selected stats data 80, 99 for each respective interactive media session that is associated with the linked video data stored on the video provider server 72 and/or live broadcast video streams stored in the video provider server. As discussed above, stats may represent the state of the user (e.g., gamer) in the game.

The metadata, in addition to that described above, may include a time stamp having a date and/or time which may correspond to a temporal location in the video, as appropriate. In one example, there may be multiple stats associated with a single time stamp. Thus, more than one type of metadata may be associated with each time stamp, in such an example. In one example, the directory server 66 and video provider server 72 may jointly manage hosting of the broadcast video data, which is provided to a $3^{rd}$ party. For instance, the directory server 66 may provide broadcast video data to the video provider server 72 in response to receiving a request from the indexing server 86. However, additional or alternate techniques for managing the live broadcast video streams have been contemplated. For instance, the directory server 66 and/or video provider server 72 may jointly provide video data including a data link stored in an internal cache, the data link providing a connection between a $3^{rd}$ party computing device and the device/server (e.g., interactive media server 56 and/or interactive media device 52) broadcasting the video streams associated with an interactive media session.

As shown, a plurality of data entries 82, 92 each with a corresponding a link 88, 94 to video data for each interactive media session, and metadata 90, 98 based upon and/or including the selected stats data 80, 99 may be generated by the indexing server 86 based on the statistics data received by the indexing server for each interactive media session. It will be appreciated that the different entries in the search index 84 may be generated for different interactive media sessions hosted by interactive media server 56 and implemented via the interactive media device 52.

The media statistics server 62 further includes a developer tool 100 and the system 50 further includes a developer computing device 102. The developer tool 100 is configured to enable the developer computing device 102 and therefore a developer to generate and/or alter statistics rules which are used to determine the selected portion of the statistics data the portion of the statistics data selected via the statistics engine 64 and/or the indexing engine 87. Therefore, a developer may send a rule change request from the device 102 to the developer tool which requests an adjustment in the way in which the portion of the statistics data is selected via the statistics engine 64 and/or indexing server 86. For example, some statistics may be set by the developer to be private, and not available for annotating as metadata linked to video data. Other statistics may be designated by the developer to be public, and thus available to be indexed as metadata for the video data on video provider server 72, within the search index 84. Additionally, the media statistics server 62 may be configured to inhibit indexing of the selected portion of the statistics data when an interactive media session is discontinued, for example, after a predetermined time period has passed, such as 10 minutes, or 5 minutes, since the last media session activity. This helps conserve server resources devoted to keeping interactive media session alive and streaming video.

Furthermore, the media statistics server 62 or the indexing server 86 is configured to provide a search interface 104 configured to receive a search query 106 from a $3^{rd}$ party computing device 108 (or interactive media device 52), which may be implemented by a contextual search process, look up one or more terms in the search query 106 in the search index 84, and send a displayable list 112 of one or more search results including the link 88 to the hosted video and/or the live broadcast video stream to the $3^{rd}$ party computing device (or interactive media device 52, as appropriate). Accordingly, it will be appreciated that the search interface 104 associated with the indexing server 86 may be accessible by a browser program via a computer network, such as the Internet. Further, the search interface may be an application programming interface (API) that is made available to interactive media developers, and the browser program may be integrated into an interactive media program executed on an interactive media device such as 52, in one example.

Selecting the link 88 may initiate a video data request 114 sent to the video provider server 72. In response to the video data request 114 the video provider server 72 sends video data 68 corresponding to the link to the $3^{rd}$ party computing device 108. The video data 68 may include an archived video clip, a live broadcast video stream, and/or a video clip from a live broadcast stream. In one example, the live broadcast video stream may be provided for viewing in near real-time. As a result, a user can be provided with video content which is relevant to their current state of play in a game. Such video content may be used as a help feature of the game, for example.

Additionally, the indexing server 86 may be configured to automatically send a list of links 118 to video data (e.g., stored or live broadcast video streams) provided by the video provider server 72 to the interactive media device 52 based on events generated in the interactive media session of the interactive media application executed by the interactive media device. This may be useful, for example, in providing in-session help to a user via a contextual search process. In one example, the contextual search process may automatically send a search query to the indexing server without user input, or if the user activates a help option, in an interactive media session. In response, the interactive media application 54 may be configured to receive the list of links 118 that include live streaming video clips and/or archived (stored) video clips that had associated metadata and/or statistics data. In this way, interactive media session help may be automatically provided to the user without user input, thereby improving a user's interactive experience. For instance, a user can be provided with video clips of a player overcoming a challenge in an interactive media session, such as completing a level, task, etc., in a gaming session. Search and rendering of the video clips may be based, at least in part, on the state of the player (e.g., user) and/or state of the game at the time the player requests help, for example.

Additionally, the video provider server 72 may be configured to generate various commands such as an "add broadcast" command and a "remove broadcast" command. The "add broadcast" command may be configured to add a live broadcast video stream to the video provider server 72 when a new live broadcast video stream is detected. Likewise, the "remove broadcast" command may be configured to remove a live broadcast video stream from the server when it is determined that the video stream has been discontinued for a duration of time (e.g., predetermined time period). Additionally, the media statistics server 62 may be configured to update statistics data 74 generated by the statistics engine 64 periodically. In some examples, the statistics data may be batched to reduce overloading of the indexing server 86. In other examples, the aforementioned commands may be implemented via the interactive media server 56.

Figure 2:
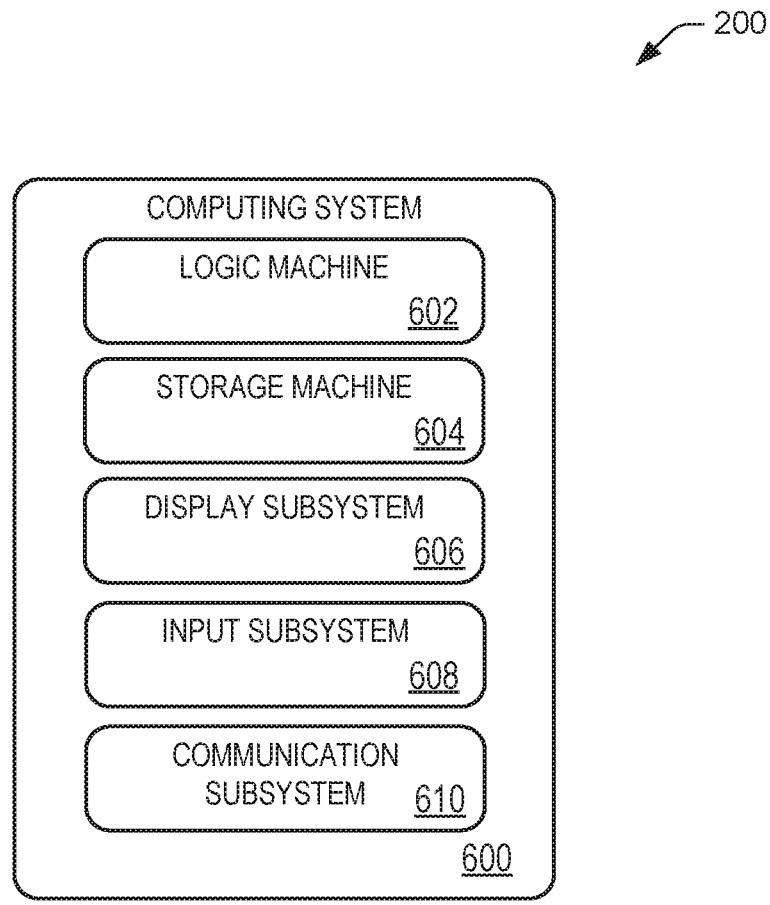
FIG. 2 schematically depicts a non-limiting embodiment of a computing system in accordance with an embodiment of the present disclosure.

FIG. 2 schematically shows a non-limiting embodiment of a computing system 200 that can enact one or more of the methods and processes described herein. Computing system 200 is shown in simplified form. Computing system 200 may take the form of a touch-screen display device, as well as any other suitable computing system, including but not limited to interactive media consoles (e.g., game consoles), one or more personal computers, server computers, tablet computers, home-entertainment computers, network computing devices, interactive media devices, mobile computing devices, mobile communication devices (e.g., smart phone), and/or other computing devices.

Computing system 200 includes a logic machine 202 and a storage machine 204. Computing system 200 may also include a display subsystem 206, input subsystem 208, communication subsystem 210, and/or other components not shown in FIG. 2.

Logic machine 202 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 204 includes one or more physical devices configured to hold instructions executable by the logic machine to implement the methods and processes described herein. When such methods and processes are implemented, the state of storage machine 204 may be transformed—e.g., to hold different data.

Storage machine 204 may include removable and/or built-in devices. Storage machine 204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 204 may include volatile, nonvolatile, dynamic, static, read/write, read-only, random-access, sequential-access, location-addressable, file-addressable, and/or content-addressable devices.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1200. For purposes the claims, the phrase "computer storage medium," "computer-readable storage medium" and variations thereof, does not include waves, signals, and/or other transitory and/or intangible communication media, per se.

It will be appreciated that storage machine 204 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 202 and storage machine 204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," "application," and "engine" may be used to describe an aspect of computing system 200 implemented to perform a particular function. In some cases, a module, program, or engine may be instantiated via logic machine 202 executing instructions held by storage machine 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," "application," and "engine" may encompass individual or groups of executable files, data files, libraries, drivers, scripts, database records, etc.

When included, display subsystem 206 may be used to present a visual representation of data held by storage machine 204. This visual representation may take the form of a graphical user interface (GUI). As the herein described methods and processes change the data held by the storage machine, and thus transform the state of the storage machine, the state of display subsystem 206 may likewise be transformed to visually represent changes in the underlying data. Display subsystem 206 may include one or more display devices utilizing virtually any type of technology. Such display devices may be combined with logic machine 202 and/or storage machine 204 in a shared enclosure, or such display devices may be peripheral display devices.

When included, input subsystem 208 may comprise or interface with one or more user-input devices such as a keyboard, mouse, touch screen, and/or controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 210 may be configured to communicatively couple computing system 200 with one or more other computing devices. Communication subsystem 210 may include wired and/or wireless communication devices compatible with one or more different communication protocols. As non-limiting examples, the communication subsystem may be configured for communication via a wireless telephone network, a wired or wireless local- or wide-area network, etc. In some embodiments, the communication subsystem may allow computing system 200 to send and/or receive messages to and/or from other devices via a network such as the Internet.

In some examples, computing system 200 may be a client device hosting a video game session played by one or more players. Computing system 200 may provide session data for the video game session to a network computing system, such as the Cloud, for example. The session data may be a broadcast/video game clip, a screenshot of the video game session, or metadata of the game session, just to name a few examples. Computing system 200 may receive one or more context-based video clips from the network computing system responsive to providing the session data. The one or more context-based video clips may be based, at least in part, on the session data. In some implementations, computing system 200 may display at least one of the context-based video clips, or a representative icon thereof, while displaying the video game session. Computing system 200 may receive an Internet link for downloadable content applicable to the video game session. Such downloadable content may include game objects (e.g., maps, armor, weapons, etc.) that can be used in the game by a player. The Internet link may be based, at least in part, on the session data. Computing system 200 may display a video clip that includes a feature corresponding to the downloadable content. For example, the video clip may show how a downloadable game object such as a weapon can be used (how to use it, when to use it) during a stage of the game that corresponds to the current context of the player and the game.

In some examples, computing system 200 hosting a video game session may provide to a network computing system session data that describes criteria or challenges set forth by the video game session. For example, criteria may include status of the current state of the video game session, statistics about one or more players of the game, among other things. Challenges may include a game situation having goals to be achieved as part of the play of the video game session (e.g., jump a wall, destroy a feature, etc.). Computing system 200 may receive one or more archive video clips from the network computing system responsive to providing the session data. The one or more archive video clips may show portions of other video game sessions that (i) substantially match the criteria or (ii) have met the challenges.

In some examples where the video game session is a multiplayer game session, computing system 200 may receive statistics data about one or players of the multiplayer game session, and may rank the one or more context-based video clips based, at least in part, on the statistics data.

Figure 3:
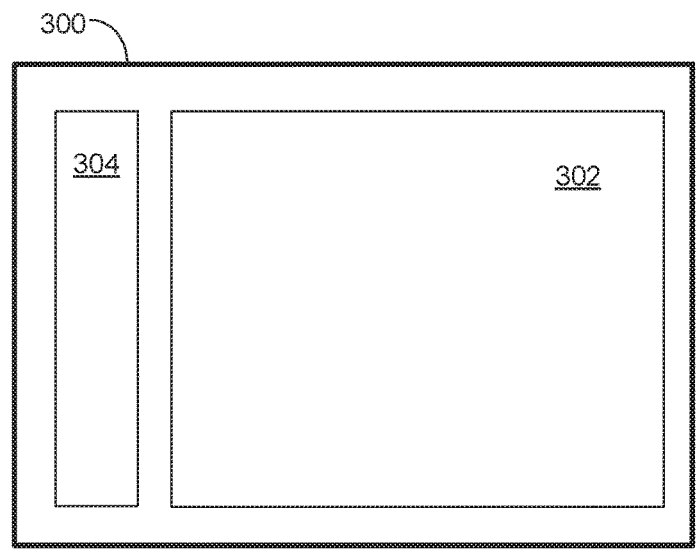
FIG. 3 illustrates an example display including a game user interface and a context-based video display portion.

FIG. 3 illustrates a display 300 including a game user interface (UI) 302 and a context-based video display portion 304, according to some examples. Display 300 may be a portion of a system, such as system 50 illustrated in FIG. 1. Game UI 302 may occupy a portion of display 300 and provide viewable aspects of video game play, such as the video game scene, maps, and various parameters of the game (e.g., scores, points, and so on). Context-based video display portion 304 may occupy another portion of display 300 and include views of one or more video clips, or thumbnail representations thereof. The video clips may correspond to the context of game play occurring in the game UI 302. Thus, for example, as a player progresses through levels or scenes of a game, video clips viewable in context-based video display portion 304 may automatically (e.g., without the player taking any particular action) change according to the current context of the game. Thus, a degree of pertinence may be maintained so the player has relatively quick and easy access to video clips that may be most helpful for the present state of game play. Context comprises, among other things, criteria associated with the game. The criteria may involve a challenge, goal, or other milestone of the user during game play (e.g., passing a level, finishing a maze, earning a reward, earning points, etc.).

In some examples, a number of players may be interactively playing a video game (or engaging in another type of interactive media content). As mentioned above, at any given time there are a number of parameters that define, at least in part, the state of the video game, in addition to the state of each player. For example, one player may have a particular position in the game, be equipped with particular tools, and so on, while another player will have another position in the game, be equipped with (possibly) different tools, and so on. The particular state of the game at a specific time, and the status or state of one or more of the players, may be considered in selecting which video clips to retrieve from a database (e.g., Cloud-based). For example, video clips selected based on context of the game may include a portion of the video game scene(s) that relatively closely matches that of the status of the game and/or players. Such a retrieved video clip may be used by any one of the players, for example, as a help video, to assist the player(s) in getting past a difficult part of the game, or to assist in determining a next move that the player(s) may make, etc. On a client device, for example, which may operate display 300, the player may mouse over one of the video clips in context-based video display portion 304 to select the video clip that the player finds particularly interesting or useful. If the video clips in context-based video display portion 304 are displayed as thumbnails (e.g., small versions of a looping video clip), such a selection may open a new window for viewing the selected video clip in a relatively large format (but need not obscure game UI 302).

In some examples, the system may automatically populate context-based video display portion 304 with context-based video clips without a need for the player to enter any information. In other words, the player need not initiate a search. In some implementations, context-based video display portion 304 may be empty until the player takes some action to start a search and retrieval of help videos. Such action may be via a speech-based user agent, as discussed below, for example.

As mentioned above, the context-based video clips may comprise help videos that may be any of a number of things. For example, a video clip may show what other (e.g., expert) players have done in a game situation that is similar to or the same as what the player is currently in. In some implementations, the player may select an option for how far ahead beyond the current level of the game such video clips may reveal. In this way, the player can avoid "spoiler" videos, which show more than a player would like to see.

In a particular example, a player may need to jump and break through a wall in a level of a game in order to advance to the next level. The player could perform a manual search for help videos on the Internet. There are several disadvantages to such a manual search. First, the manual search may require the player to shift focus from the game to the search. Second, the answer the player needs may depend on any of a number of aspects (e.g., weapon count, status of other players of the game, position in a tournament, etc.) of the state of game play, and the player may not realize that some of these aspects are important. Thus, the player would not know to include such aspects into a search for help videos. In contrast, an automatic context-based search, as described herein, may take into account all pertinent aspects of the state of game play. Accordingly, help videos retrieved by a context-based search may be substantially more useful to the player as compared to videos retrieved by a player-initiated search.

In some examples, other aspects of the state of game play may be considered in a context-based search. Such other aspects may include the player's personal data (the player has the option to turn off the feature where the player's personal data is considered), whether the game is part of a tournament, historical game session data, who the other players are in a multi-player game, just to name a few examples.

In some examples, for multi-player games, while waiting for the game to load, and during such initial stages of play, the system may provide in context-based video display portion 304 videos that show how the particular opponents tend to play. Such videos may show what these other players have done in past game sessions. In some implementations, the system may determine the best player that has played on a particular map or other scene of a game. Such determination may be based, at least in part, on history of performance of players (e.g., kill-death (KD) ratio is an indication of skill level. Thus, players may be sorted by skill level using the KD ratio).

In some examples, although a context-based search may be automatic, the player, or other user, may select among a number of options and parameters so that the automatic searches are tailored a particular way.

In some examples, a speech-based user agent, such as Cortana® by Microsoft Corporation, may be used by the player to initiate an automatic context-based search. For example, the player may be unsure of a next direction of travel in the game. By a voice command, the player can ask the user agent for help in deciding which direction to travel in the game. The user agent may initiate a context-based search.

In some examples, a video clip may be tagged if an achievement was unlocked during the time span covered by the video clip (e.g., achieving a headshot from 1000 yards away in the game). Subsequent searches may use such tagging. Also, a video clip may be tagged with stats used towards unlocking an achievement (e.g., treasure chest found in the game), and may enable a user to search for video clips that show where a player is (was) close to unlocking such an achievement, or where a player is (was) near the same level of progress as the user.

In some examples, videos may be annotated with data that indicates how helpful players have found the videos to be. For example, a player may rate a video subsequent to watching the video. Because the most helpful videos can be placed toward the top of a search list, such rating may be useful for a community of players.

In some examples, videos retrieved by context-based searches may be provided to a device other than the device that initiated the search. For example, a context-based search for a player on a first device may be performed and result in retrieval of a number of help videos. The retrieved help videos may be subsequently provided to a second device, which may be portable and/or handheld. This may be useful for a player that wishes to study help videos on a portable device throughout the day, for example, and be prepared to play the game on a home computer (e.g., larger display) in the evening.

Figure 4:
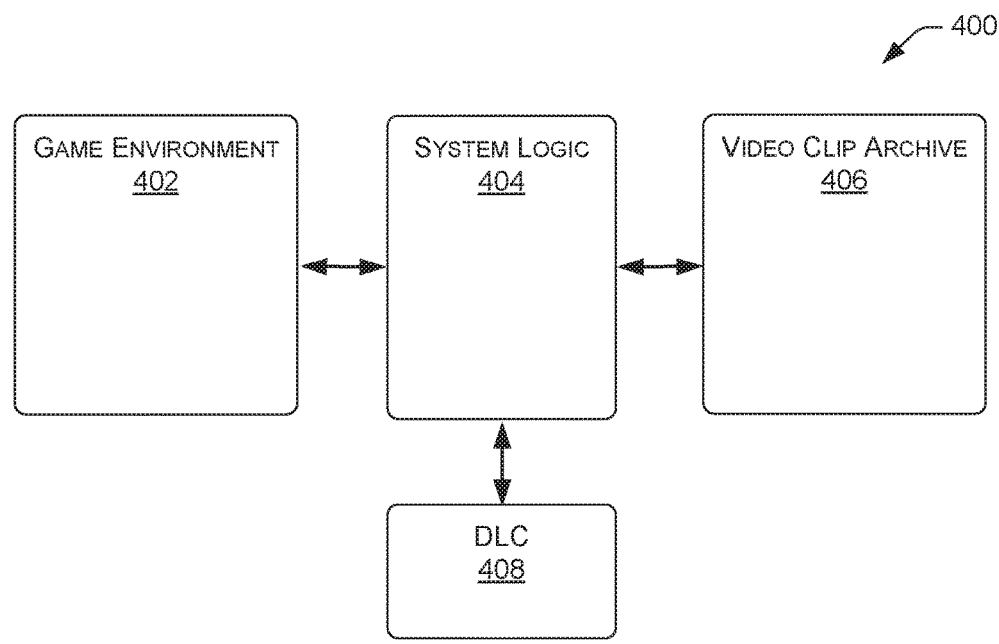
FIG. 4 is a block diagram illustrating flow of communication for providing context-based video generated from interactive media sessions, according to some examples.

FIG. 4 is a block diagram illustrating flow of communication in a system 400 for providing context-based video generated from interactive media sessions, according to some examples. System 400 may include a game environment 402, system logic 404, video clip archive 406, and a downloadable content (DLC) block 408. Game environment 402 may include a display such as display 300, for example, and I/O devices that allow a player to play a video game individually, in a multi-player environment, or in a tournament setting. System logic 404 may be the same as or similar to portions of system 50 that operate between an interactive media server and a network-based (e.g., Cloud) memory.

In some examples, system 400 may provide searchable video data generated from a plurality of interactive game media sessions performed at a number of interactive media servers, which may be included in game environment 402. The interactive media servers may generate video clips or screenshots associated with each of the interactive game media sessions and a video provider server may provide connections to the video clips or screenshots for viewing. The video provider, which may be included in system logic 404, may further annotate the video clips or screenshots with metadata that can be used for context-based searches.

System logic 404 may be configured to perform a contextual search of the video clips based, at least in part, on a state of interactive game media content in game environment 402 substantially at the time the contextual search is initiated. The interactive game media content may comprise a video game and the state of interactive media content may include the state of a player and/or the state of the video game.

In some examples, system logic 404 may further include a directory server configured to maintain the directory of the video clips provided by the video provider server for each interactive media session. System logic 404 may generate a searchable index of the directory, including a plurality of entries that each include a link to one of the archived video clips for a corresponding interactive game media session, and metadata associated with the corresponding interactive game media session. The metadata may be generated based upon the statistics data for the corresponding interactive game media session, for example.

DLC block 408 may comprise a memory that stores lists of Internet links to businesses and products associated with video games. In some implementations, a contextual search initiated in game environment 402 may determine if a player may benefit from purchasing a game item. The search may prompt the game environment 402 to suggest to the player that a particular gaming item may be worthwhile to purchase. DLC block 408 may provide links for the particular gaming item to game environment 402 so that the links can be displayed to the player. In other implementations, game environment 402 may determine if a player may benefit from purchasing a game item based on the context of the player and/or the game. An actual context-based search for videos need not occur for such a determination. The game environment 402 may suggest to the player that a particular gaming item may be worthwhile to purchase. DLC block 408 may provide links for the particular gaming item to game environment 402 so that the links can be displayed to the player. Such items may be durable content (e.g., weapons, armor, maps, and so on) or consumable content (e.g., currency, food, and so on), just to name a few examples.

In some examples, game environment 402 may provide videos of purchasable downloadable content being used in the context (e.g., the scene or level) of play of the game that the player is currently in. Such videos may be considered to be help videos because they are potentially helpful to the player in determine whether to purchase the downloadable content and/or how to use the downloadable content in the current state of the game.

Figure 5:
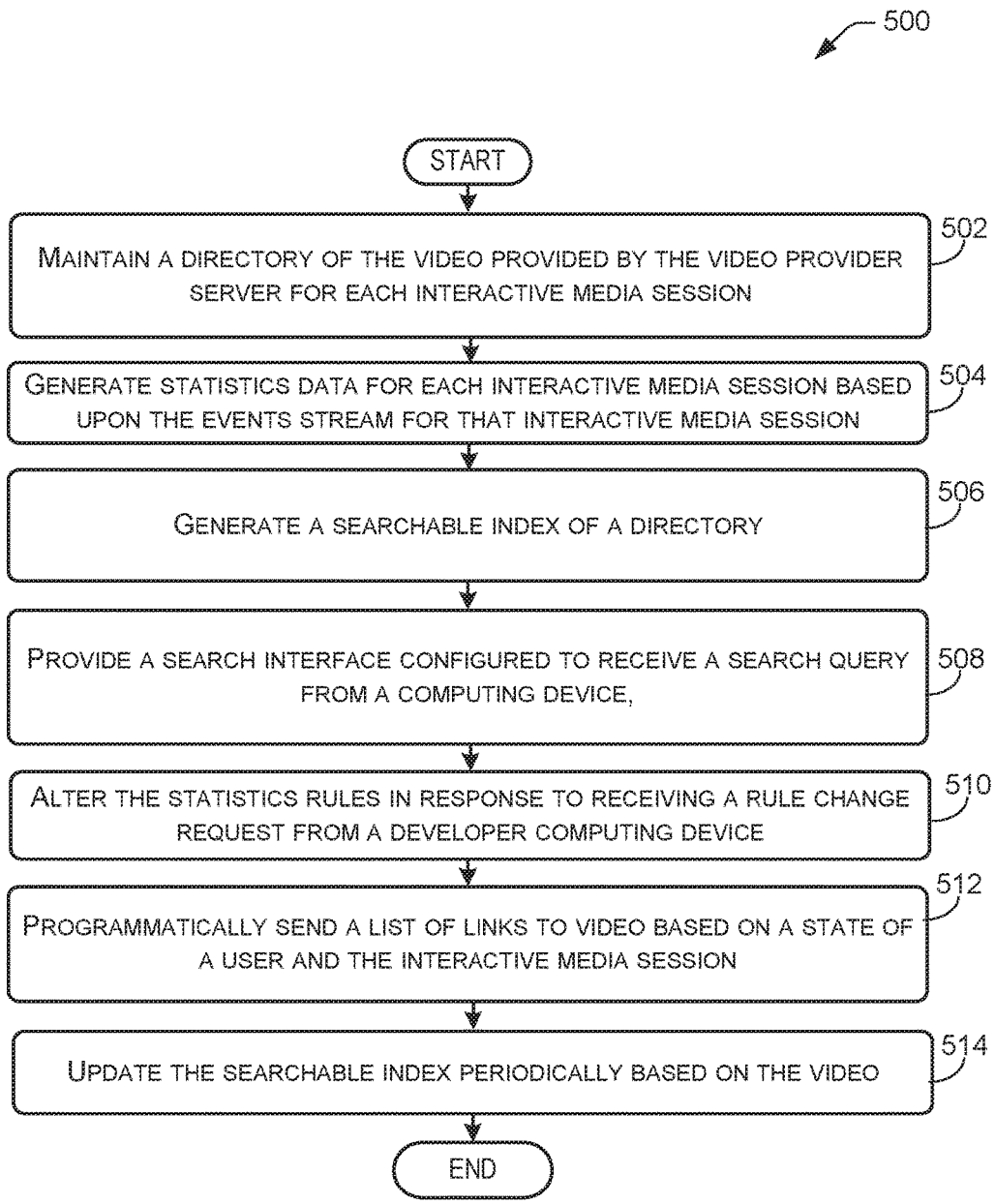
FIG. 5 is a flow diagram for providing searchable video generated from interactive media sessions, according to some examples.

FIG. 5 is a flow diagram for a method 500 of providing searchable video generated from interactive media sessions, according to some examples. Such searchable videos may subsequently be provided to an interactive media server for a context-based search. The flows of operations illustrated in FIG. 5 are illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor to perform the recited operations. In the context of hardware, the blocks may represent one or more circuits (e.g., FPGAs, application specific integrated circuits—ASICs, etc.) configured to execute the recited operations.

Any process descriptions, variables, or blocks in the flows of operations illustrated in FIG. 5 may represent modules, segments, or portions of code that include one or more executable instructions for implementing specific logical functions or variables in the process.

The method may be implemented by a processor, for example, via the system 50 described above with regard to FIG. 1 or another suitable system. The method includes generating a video stream for each interactive media session executed by an interactive media server (which need not be the same as the interactive media server performing a context-based search). The video stream is typically generated on the interactive media server, but may be generated elsewhere, such as at the media statistics server or video provider server.

At 502, a processor may maintain on a directory server a directory of video provided by the video provider server for each interactive media session. The directory typically includes a list of links to video for each interactive media session. Thus, the directory can act as a portal for video viewing. At 504, the processor may generate statistics data for each interactive media session based upon the events stream for that interactive media session. Typically at least some of the statistics which are generated are selected based on rules set by the interactive media developer and media platform operator. Other statistics may be automatically generated, in one example.

At 506, the processor may generate a searchable index of the directory including a plurality of entries, each entry including (a) a link to the video data for a corresponding interactive media session, and (b) metadata associated with the corresponding interactive media session, the metadata being generated based upon the statistics data for the corresponding interactive media session. The indexing is typically performed periodically or from time to time, for example, every 30 seconds, so that the index keeps a fairly current account of the contents of the directory, with each link to interactive media session video data being annotated with metadata derived from current interactive media statistics for the same interactive media session within the index, so that users can soon find relevant video data to view with contextual searches. Additionally, the step of generating the searchable index may be implemented via the indexing server.

At 508 the processor may provide a search interface configured to receive a contextual search from a computing device (such as a 3$^{rd}$ party computing device or interactive media device), look up one or more terms in the resulting search query in the searchable index, and send to the computing device a displayable list of one or more search results including at least one of the links corresponding to one of the (archived or otherwise stored) videos provided by the video provider server. In one example, the contextual search may include filters and search options related to the metadata and to the state of play of a player and/or a video game being played by the player or players (or other type of interactive video content).

At 510 the processor may alter the statistics rules in response to receiving a rule change request from a developer computing device. At 512 the processor may programmatically send a list of links to video based on a state (e.g., context) of a user and the interactive media session generated via an interactive media device from the indexing server to the interactive media device. At 514 the processor may update the searchable index periodically based on the live broadcast video streams.

In some embodiments, the methods and processes described herein may be tied to a computing system of one or more computing devices. In particular, such methods and processes may be implemented as a computer-application program or service, an application-programming interface (API), a library, and/or other computer-program product. Further, as described above, the servers (interactive media server, media statistics server, indexing server, video provider server, and directory server) described herein are server programs executed on server devices, each server device including an associated processor and non-volatile memory configured to store the server program. The processor of each server device is configured to execute the server program using portions of volatile memory. Further search interface 104 (FIG. 1) may be a dedicated web server device having a processor and associated stored program in non-volatile memory that is configured to serve a search interface, or may be an API served by an application server of similar construction to various computing devices. The interactive media device and developer computing device likewise have associated processors, non-volatile memory, volatile memory, and stored programs for implementing the functions described herein.

Figure 6:
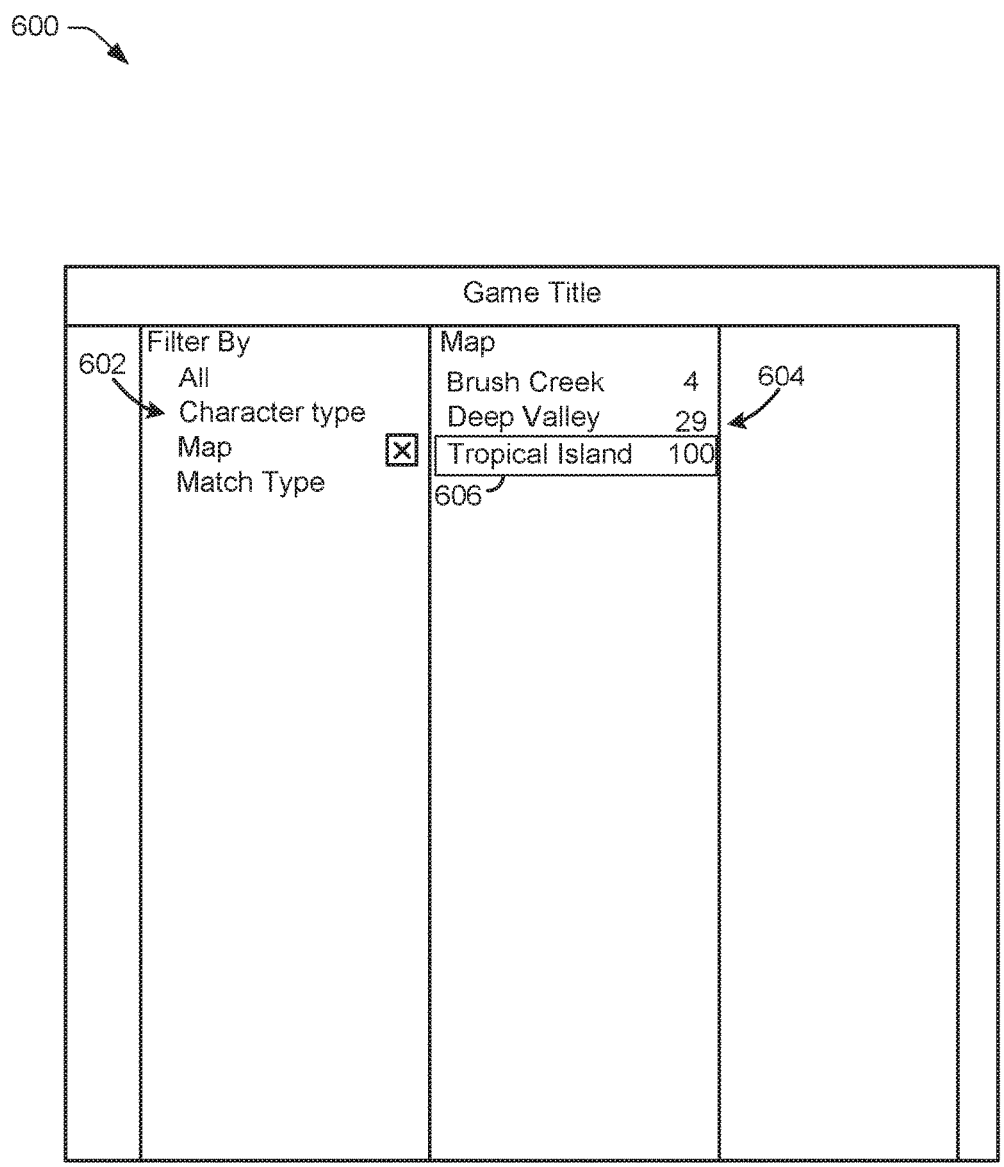
FIGS. 6 and 7 illustrate search interfaces for searching interactive media content and interactive media clips, according to various examples.

FIG. 6 illustrates an example search interface 600 where an interactive media title (e.g., game title) may be filtered by various categories 602 such as map, character type, and match type. It will be appreciated that the interactive media title may have a plurality of associated live broadcast video streams of interactive media sessions. As shown, when the map filter is selected a number of types of maps 604 are shown with the number of corresponding video links. Thus, each category can include a plurality of fields. The state of play of a user (or multiple users) of a video game or the state of other types of interactive media content (e.g., context) may result in selecting a specific map 606, for example, to further narrow the search. It will be appreciated that the categories may be metadata associated with statistical data generated by the statistics engine, described above with regard to FIG. 1. Selecting a category may refine a search for live broadcast video streams and provide links to live broadcast video streams associated with the selected category. In this way, the search interface can be used to return relevant context-based video streams corresponding to live interactive media sessions.

Figure 7:
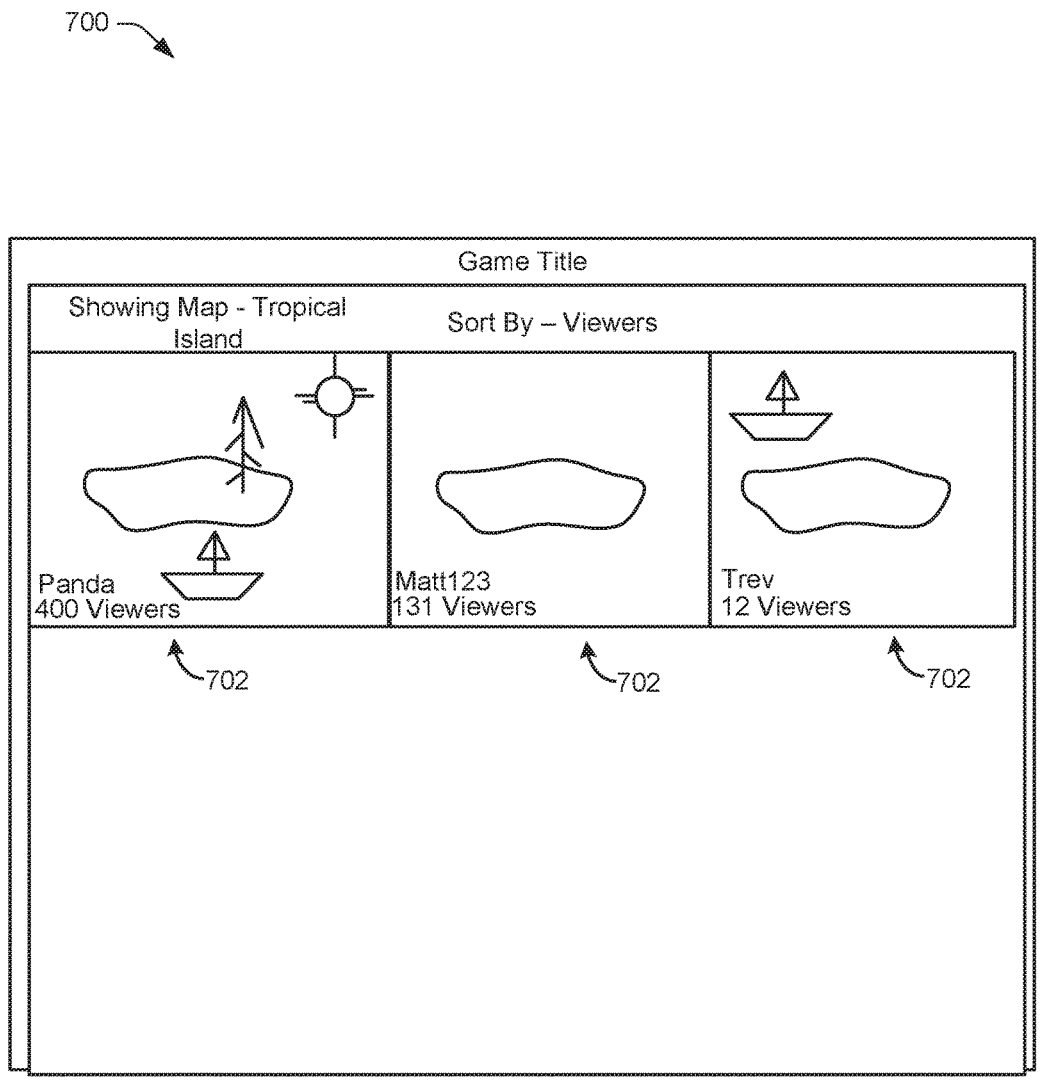

FIG. 7 shows another example search interface 700 where the specific map 606 (i.e., Tropical Island"), shown in FIG. 6, is selected and links 702 to video data corresponding to the map type are displayed. Specifically, the links 702 may correspond to live broadcast video streams provided via the video provider server or the directory server. It will be appreciated that clicking or otherwise selecting the links 702 can prompt streaming of a corresponding live broadcast video.

Figure 8:
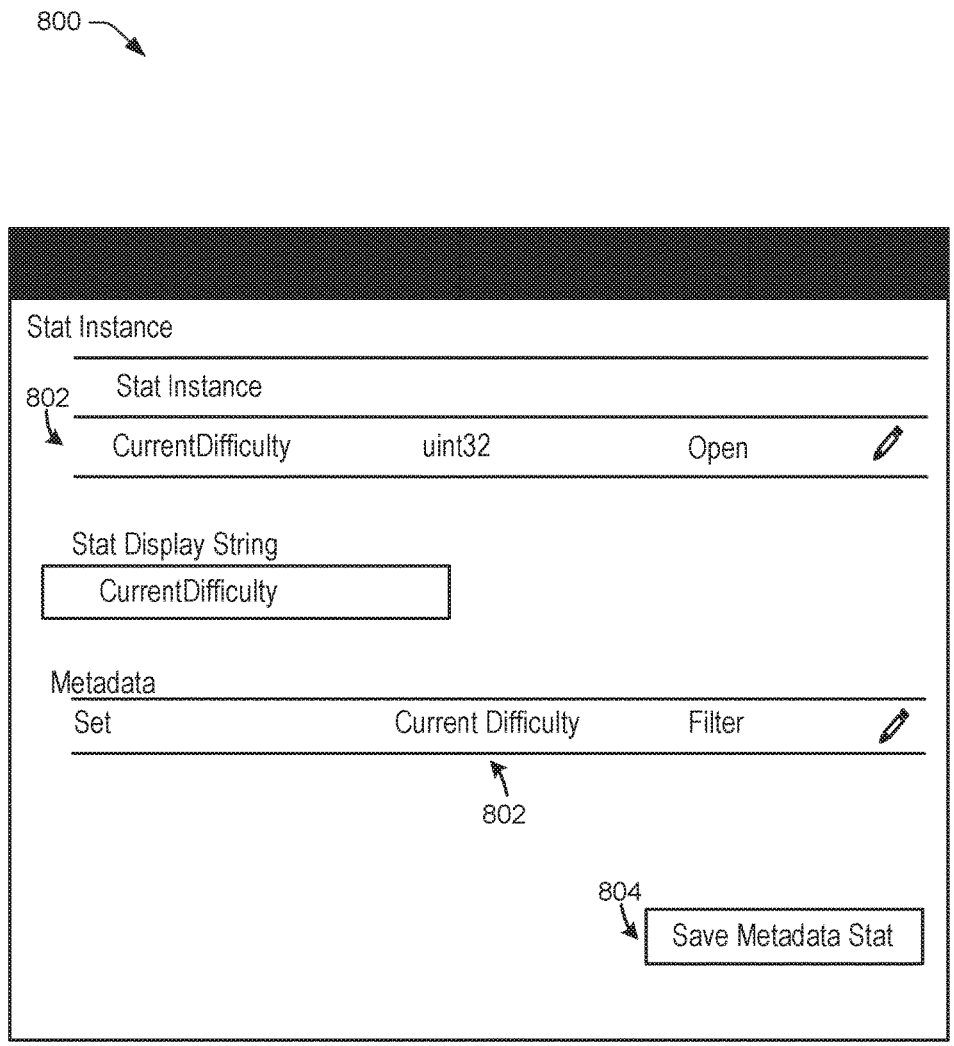
FIG. 8 shows a developer interface which may be generated by the developer tool shown in the system depicted in FIG. 1.

FIG. 8 shows a developers interface 800 which may be used by a developer to define the type of statistical data that is selected by the statistics engine. It will be appreciated that the search interfaces shown in FIGS. 6 and 7 and the developer interface 800 shown in FIG. 8 are examples of interfaces that may be provided by the system 50 shown in FIG. 1 or via the method 500 shown in FIG. 5. The developer interface 800 includes fields 802 that enable statistics instances to be selected or input into the interface. It will be appreciated that selecting or entering the statistics instances can enable the statistics engine to gather statistics data associated with the statistics instances. In this way, a developer can select the statistics data that is collected according to their predilection. A button 804 is provided to save the statistical instance. As a result, a developer can customize the types of statistical data which is collected by the system. The developer may configure any of a number of parameters or structure for how a contextual search may be implemented for a particular title or other interactive media content.

Figure 9:
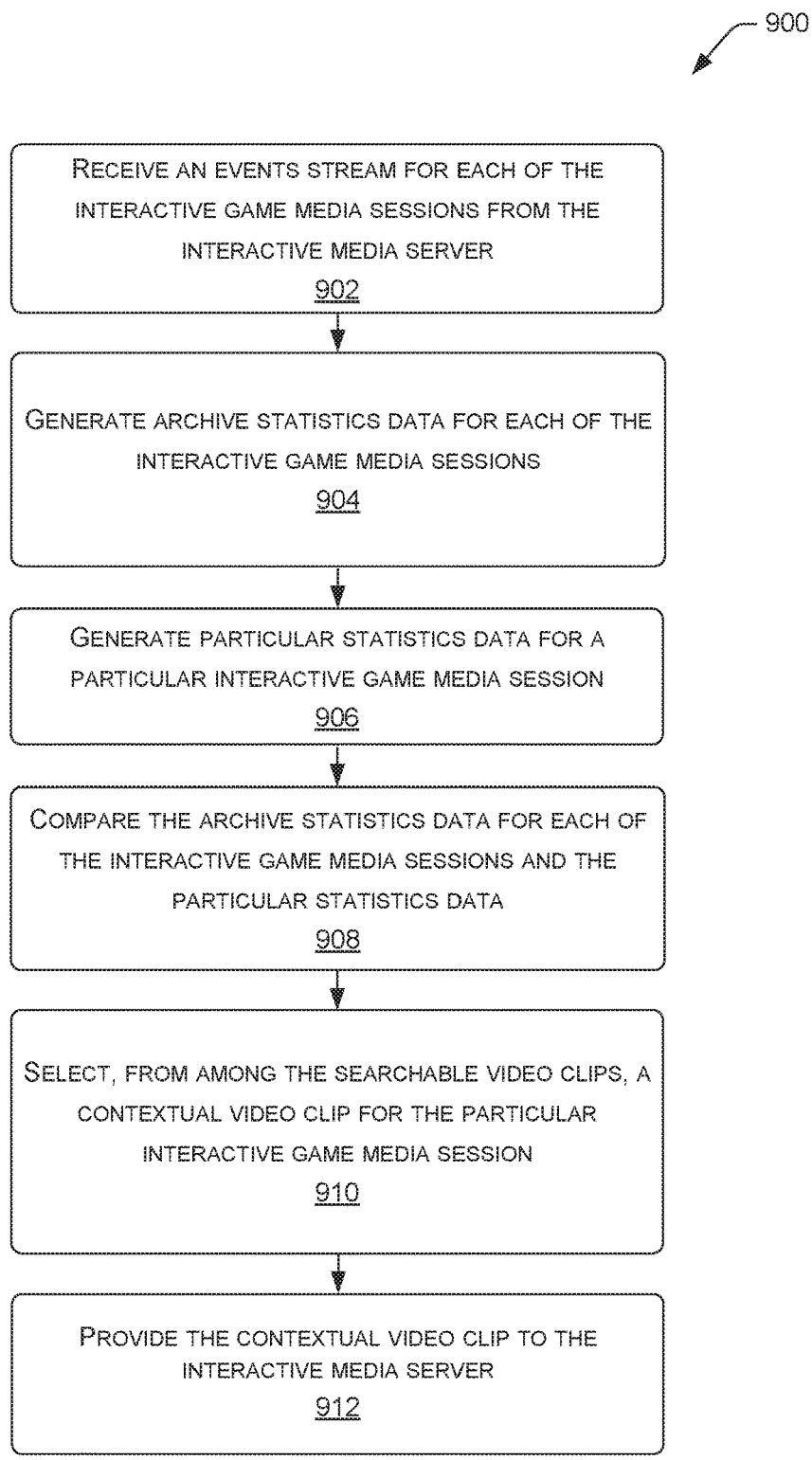
FIG. 9 is a flow diagram for providing context-based video to an interactive media server, according to some examples.

FIG. 9 is a flow diagram illustrating a process 900 for providing searchable video clips generated from a plurality of interactive game media sessions at an interactive media server, according to some examples. The flows of operations illustrated in FIG. 9 are illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor to perform the recited operations. In the context of hardware, the blocks may represent one or more circuits (e.g., FPGAs, application specific integrated circuits—ASICs, etc.) configured to execute the recited operations.

Any process descriptions, variables, or blocks in the flows of operations illustrated in FIG. 9 may represent modules, segments, or portions of code that include one or more executable instructions for implementing specific logical functions or variables in the process.

Process 900 may be performed by a processor included in computing system 200, for example. At 902, the processor may receive an events stream for each of the interactive game media sessions from the interactive media server. For example, a screenshot of video game play may be an event stream. At 904, the processor may generate archive statistics data for each of the interactive game media sessions based, at least in part, on the respective events stream. The archive statistics data may be representative of, at least in part, a state of the respective interactive game media sessions. Statistics data may include one or more of map type, weapon type, tool type, game points data, and game level data, augmented data corresponding to multiplayer game sessions or structured competitive gaming tournaments, just to name a few examples. At 906, the processor may generate particular statistics data for a particular interactive game media session. At 908, the processor may compare the archive statistics data for each of the interactive game media sessions and the particular statistics data. At 910, the processor may select, from among the searchable video clips, a contextual video clip for the particular interactive game media session based, at least in part, on the comparing. At 912, the processor may provide the contextual video clip to the interactive media server. The contextual video clip may be provided to the interactive media server automatically, without any action of a user of the interactive media server, for example.

Example Clauses

The following clauses describe multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed.

A. A method for providing searchable video clips generated from a plurality of interactive game media sessions at an interactive media server, the method comprising: receiving an events stream for each of the interactive game media sessions from the interactive media server; generating archive statistics data for each of the interactive game media sessions based, at least in part, on the respective events stream, wherein the archive statistics data is representative of, at least in part, a state of the respective interactive game media sessions; generating particular statistics data for a particular interactive game media session; comparing the archive statistics data for each of the interactive game media sessions and the particular statistics data; selecting, from among the searchable video clips, a contextual video clip for the particular interactive game media session based, at least in part, on the comparing; and providing the contextual video clip to the interactive media server.

B. The method as claim A recites, further comprising: generating a searchable index of a directory of archived video clips, the searchable index including a plurality of entries, each entry including (a) a link to one of the archived video clips for a corresponding interactive game media session, and (b) metadata associated with the corresponding interactive game media session, the metadata being generated based upon the statistics data for the corresponding interactive game media session.

C. The method as claim B recites, further comprising, providing a search interface configured to: receive a contextual search query from the interactive media server, look up one or more statistics or parameters of the contextual search query in the searchable index; and send to the interactive media server the contextual video clip based, at least in part, on the one or more statistics or parameters of the contextual search query.

D. The method as claim A recites, further comprising: selecting an Internet link for downloadable content, wherein the selecting the Internet link is based, at least in part, on the particular statistics data for the particular interactive game media session; and providing the Internet link with the contextual video clip to the interactive media server.

E. The method as claim A recites, wherein the respective events stream comprises a screenshot of the respective interactive game media sessions.

F. The method as claim A recites, wherein the respective events stream comprises a screenshot of the respective interactive game media sessions.

G. The method as claim A recites, further comprising: receiving a review of the contextual video clip from the interactive media server; and updating the particular statistics data for the particular interactive game media session based, at least in part, on the review.

H. The method as claim A recites, further comprising: receiving statistics rules from a developer of the interactive game media; and applying the statistics rule to the events stream to generate at least a portion of the archive statistics data.

I. The method as claim A recites, where the statistics data includes one or more of map type, weapon type, tool type, game points data, and game level data.

J. The method as claim A recites, wherein the statistics data comprises augmented data corresponding to multiplayer game sessions or structured competitive gaming tournaments.

K. The method as claim A recites, wherein the contextual video clip is provided to the interactive media server automatically, without any action of a user of the interactive media server.

L. A method comprising: hosting a video game session; providing to a network computing system session data that describes criteria or challenges set forth by the video game session; and receiving one or more archive video clips from the network computing system responsive to providing the session data, wherein the one or more archive video clips show portions of other video game sessions that (i) substantially match the criteria or (ii) have met the challenges.

M. The method as claim L recites, further comprising: displaying at least one of the archive video clips, or a representative icon thereof, while displaying the video game session.

N. The method as claim L recites, further comprising: receiving an Internet link for downloadable content applicable to the video game session, wherein the Internet link is based, at least in part, on the session data.

O. The method as claim N recites, further comprising: displaying a video clip that includes a feature corresponding to the downloadable content.

P. The method as claim L recites, wherein the video game session is a multiplayer video game session or competitive gaming tournament, further comprising: receiving statistics data about one or players of the multiplayer video game session or competitive gaming tournament; and ranking the one or more archive video clips based, at least in part, on the statistics data.

Q. The method as claim L recites, wherein the session data comprises a screenshot of the video game session or metadata of the video game session.

R. A system comprising: one or more processors; and computer-readable media having instructions that, when executed by the one or more processors, configure the one or more processors to perform operations comprising: hosting a video game session; generating in real time metadata that describes a context of a current state of the video game session; providing the metadata to a network computing system; and receiving one or more video clips from the network computing system responsive to providing the metadata, wherein the one or more video clips show portions of historical video game sessions in a state that (i) substantially matches the context of the current state of the video game session.

S. The system as claim R recites, the operations further comprising: displaying the one or more video clips adjacent to a display of the video game session.

T. The system as claim R recites, wherein the context comprises criteria associated with the video game session, and wherein the historical video game sessions provide an indication of how to meet the criteria.

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "may" or "may," unless specifically stated otherwise, are understood within the context to present that certain examples include, while other examples do not include, certain features, variables and/or steps. Thus, such conditional language is not generally intended to imply that certain features, variables and/or steps are in any way required for one or more examples or that one or more examples necessarily include logic for deciding, with or without user input or prompting, whether certain features, variables and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

Any process descriptions, variables or blocks in the flow diagrams described herein and/or depicted in the attached figures should be understood as potentially representing modules, segments, or portions of code that include one or more executable instructions for implementing specific logical functions or variables in the routine. Alternate implementations are included within the scope of the examples described herein in which variables or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the variables of which are to be understood as being among other acceptable examples. All such modifications and variations are intended to be included herein within the scope of this disclosure and protected by the following claims.

What is claimed is:

1. A method for providing searchable video clips generated from a plurality of interactive game media sessions at an interactive media server, the method comprising:
   receiving an events stream for each of the interactive game media sessions from the interactive media server;
   receiving developer statistics rules which indicate rules for generating archive statistics data based on a developer of the interactive game media;
   applying the developer statistics rules to the events stream;
   generating the archive statistics data for each of the interactive game media sessions based, at least in part, on the respective events stream and the developer statistics rules, wherein the archive statistics data is representative of, at least in part, a state of the respective interactive game media sessions;
   generating particular statistics data for a particular interactive game media session;
   comparing the archive statistics data for each of the interactive game media sessions and the particular statistics data;
   selecting, from among the searchable video clips, a contextual video clip for the particular interactive game media session based, at least in part, on the comparing; and
   providing the contextual video clip to the interactive media server.

2. The method of claim 1, further comprising:
generating a searchable index of a directory of archived video clips, the searchable index including a plurality of entries, each entry including (a) a link to one of the archived video clips for a corresponding interactive game media session, and (b) metadata associated with the corresponding interactive game media session, the metadata being generated based upon the statistics data for the corresponding interactive game media session.

3. The method of claim 2, further comprising, providing a search interface configured to:
receive a contextual search query from the interactive media server;
look up one or more statistics or parameters of the contextual search query in the searchable index; and
send to the interactive media server the contextual video clip based, at least in part, on the one or more statistics or parameters of the contextual search query.

4. The method of claim 1, further comprising:
selecting an Internet link for downloadable content, wherein the selecting the Internet link is based, at least in part, on the particular statistics data for the particular interactive game media session; and
providing the Internet link with the contextual video clip to the interactive media server.

5. The method of claim 1, wherein the respective events stream comprises a screenshot of the respective interactive game media sessions.

6. The method of claim 1, further comprising:
receiving a review of the contextual video clip from the interactive media server; and
updating the particular statistics data for the particular interactive game media session based, at least in part, on the review.

7. The method of claim 1, where the statistics data includes one or more of map type, weapon type, tool type, game points data, and game level data.

8. The method of claim 1, wherein the statistics data comprises augmented data corresponding to multiplayer game sessions or structured competitive gaming tournaments.

9. The method of claim 1, wherein the contextual video clip is provided to the interactive media server automatically, without any action of a user of the interactive media server.

10. A system for providing searchable video clips generated from a plurality of interactive game media sessions at an interactive media server, the system comprising:
a memory storing instructions; and
at least one processor coupled with the memory and configured to execute the instructions to:
receive an events stream for each of the interactive game media sessions from the interactive media server;
receiving developer statistics rules which indicate rules for generating archive statistics data based on a developer of the interactive game media;
applying the developer statistics rules to the events stream;
generate the archive statistics data for each of the interactive game media sessions based, at least in part, on the respective events stream and the developer statistics rules, wherein the archive statistics data is representative of, at least in part, a state of the respective interactive game media sessions;
generate particular statistics data for a particular interactive game media session;
compare the archive statistics data for each of the interactive game media sessions and the particular statistics data;
select, from among the searchable video clips, a contextual video clip for the particular interactive game media session based, at least in part, on the comparing; and
provide the contextual video clip to the interactive media server.

11. The system of claim 10, wherein the at least one processor is further configured to execute the instructions to:
generate a searchable index of a directory of archived video clips, the searchable index including a plurality of entries, each entry including (a) a link to one of the archived video clips for a corresponding interactive game media session, and (b) metadata associated with the corresponding interactive game media session, the metadata being generated based upon the statistics data for the corresponding interactive game media session.

12. The system of claim 11, wherein the at least one processor is further configured to execute the instructions to:
provide a search interface configured to:
receive a contextual search query from the interactive media server;
look up one or more statistics or parameters of the contextual search query in the searchable index; and
send to the interactive media server the contextual video clip based, at least in part, on the one or more statistics or parameters of the contextual search query.

13. The system of claim 10, wherein the at least one processor is further configured to execute the instructions to:
select an Internet link for downloadable content, wherein the selecting the Internet link is based, at least in part, on the particular statistics data for the particular interactive game media session; and
provide the Internet link with the contextual video clip to the interactive media server.

14. The system of claim 10, wherein the respective events stream comprises a screenshot of the respective interactive game media sessions.

15. The system of claim 10, wherein the at least one processor is further configured to execute the instructions to:
receive a review of the contextual video clip from the interactive media server; and
update the particular statistics data for the particular interactive game media session based, at least in part, on the review.

16. The system of claim 10, where the statistics data includes one or more of map type, weapon type, tool type, game points data, and game level data.

17. The system of claim 10, wherein the statistics data comprises augmented data corresponding to multiplayer game sessions or structured competitive gaming tournaments.

18. A computer-readable storage medium storing computer executable instructions for providing searchable video clips generated from a plurality of interactive game media sessions at an interactive media server, comprising:
code executable by a processor to:
receive an events stream for each of the interactive game media sessions from the interactive media server;
receiving developer statistics rules which indicate rules for generating archive statistics data based on a developer of the interactive game media;

applying the developer statistics rules to the events stream;
generate the archive statistics data for each of the interactive game media sessions based, at least in part, on the respective events stream and the developer statistics rules, wherein the archive statistics data is representative of, at least in part, a state of the respective interactive game media sessions;
generate particular statistics data for a particular interactive game media session;
compare the archive statistics data for each of the interactive game media sessions and the particular statistics data;
select, from among the searchable video clips, a contextual video clip for the particular interactive game media session based, at least in part, on the comparing; and
provide the contextual video clip to the interactive media server.

* * * * *